Nov. 1, 1960   A. B. NEWTON ET AL   2,958,459
BLOWER FABRICATION
Filed June 1, 1956   4 Sheets-Sheet 1
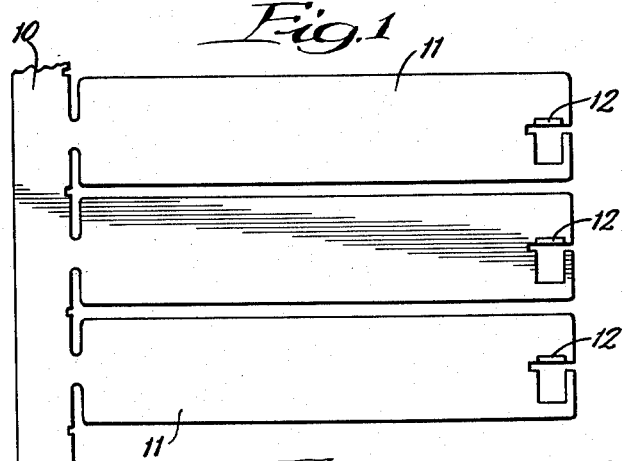
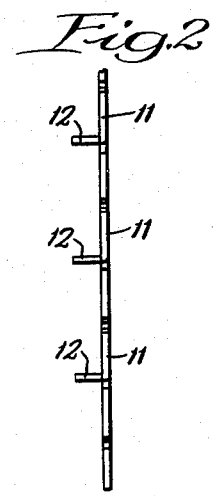
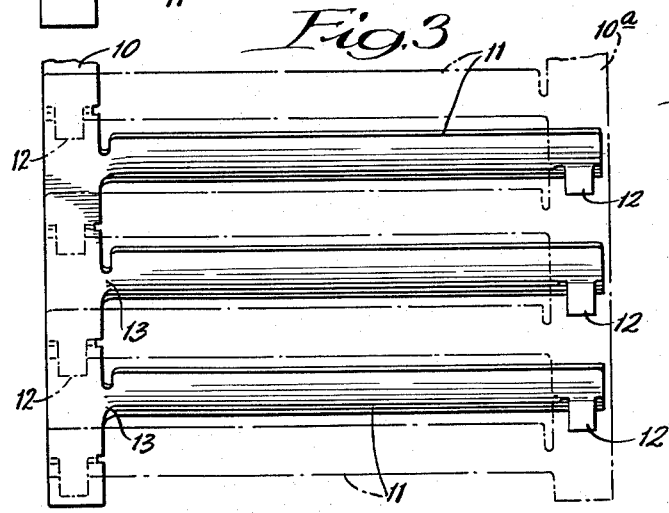
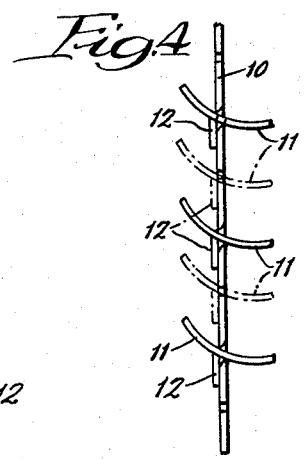
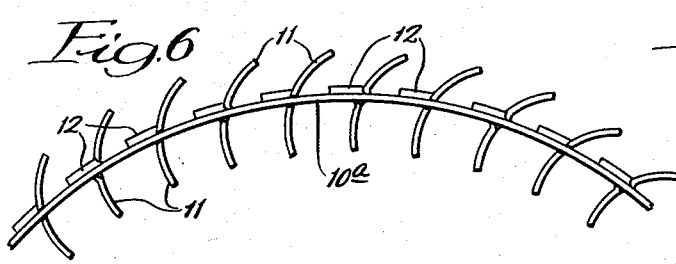
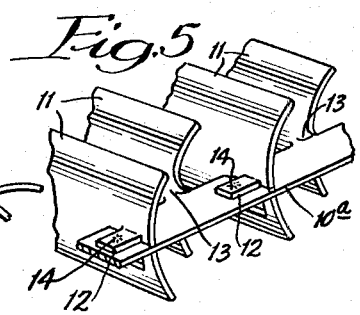
INVENTORS:
Atwin B. Newton and
BY Francis W. Osborn,
Dawson, Tilton + Graham,
ATTORNEYS.

Nov. 1, 1960   A. B. NEWTON ET AL   2,958,459
BLOWER FABRICATION
Filed June 1, 1956   4 Sheets-Sheet 2
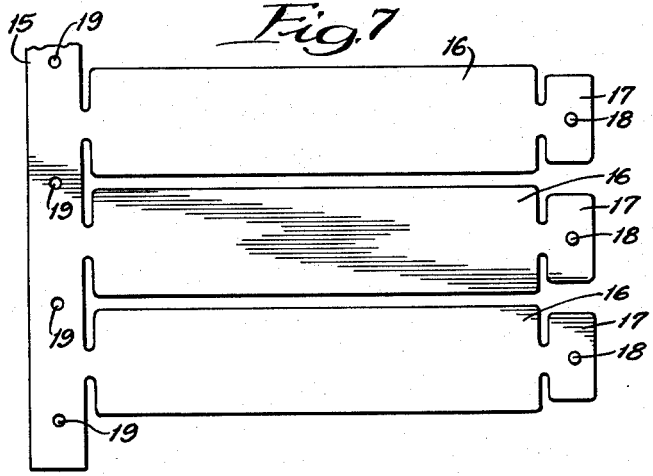
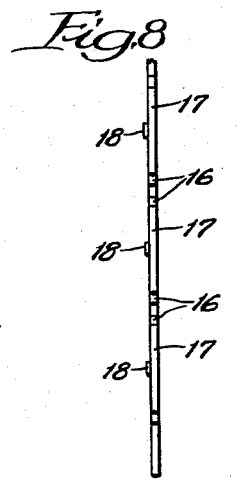
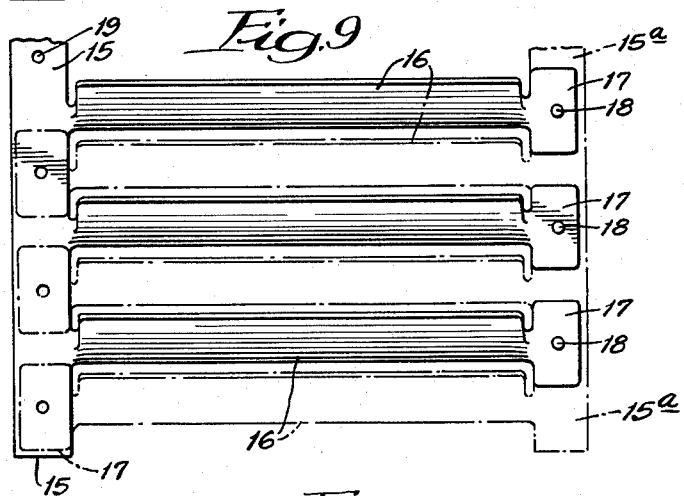
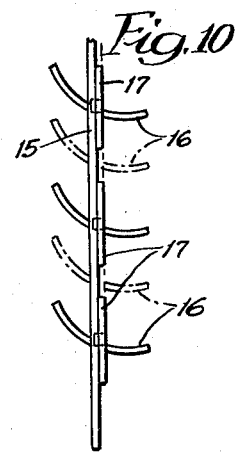
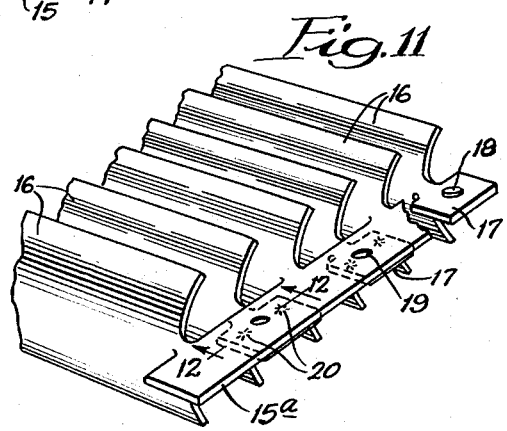
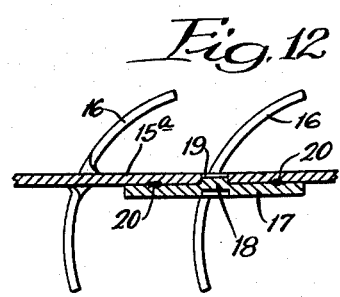
INVENTORS:
Alwin B. Newton and
BY Francis W. Osborn,
Dawson, Tilton & Graham,
ATTORNEYS.

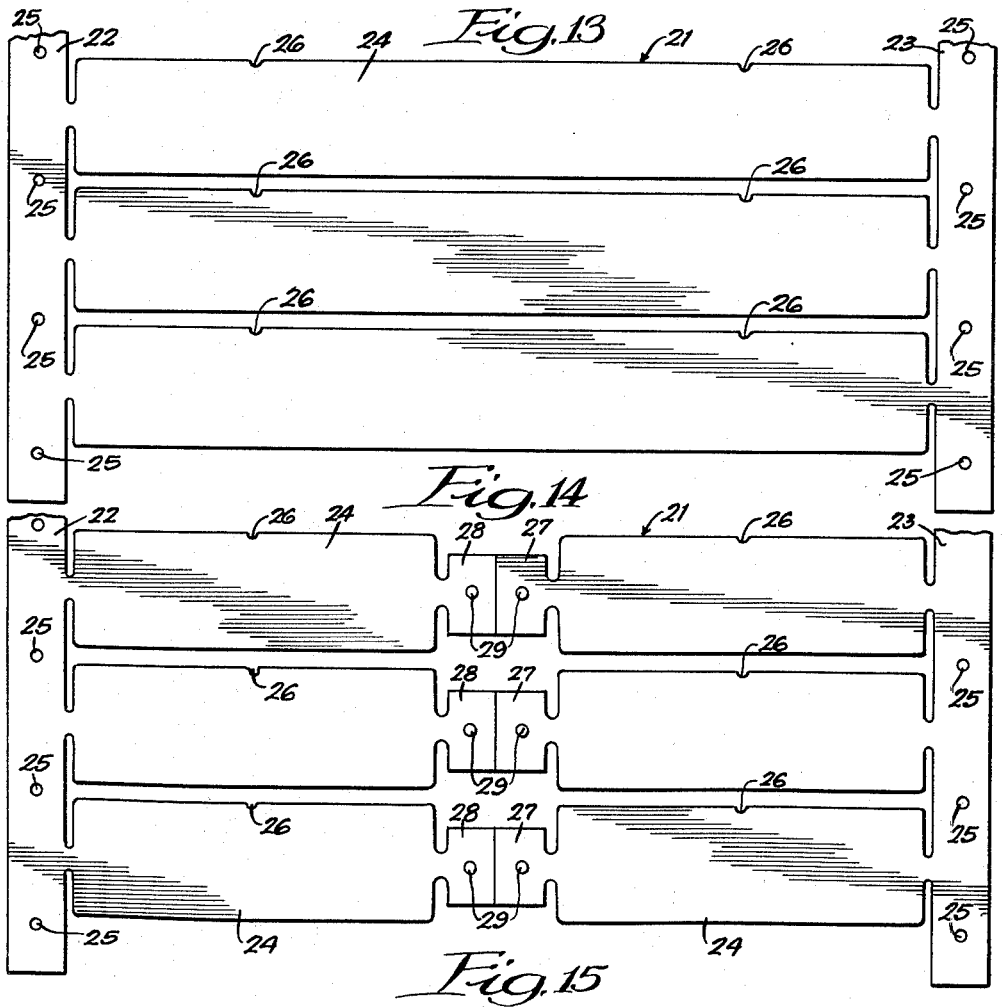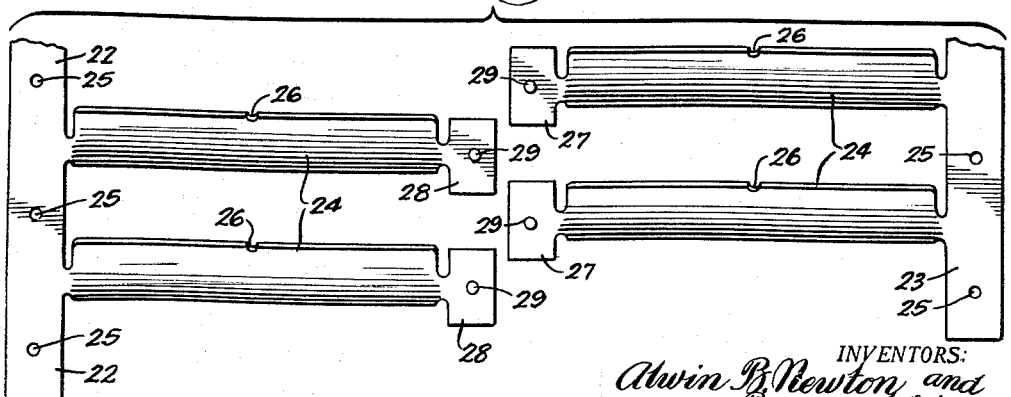

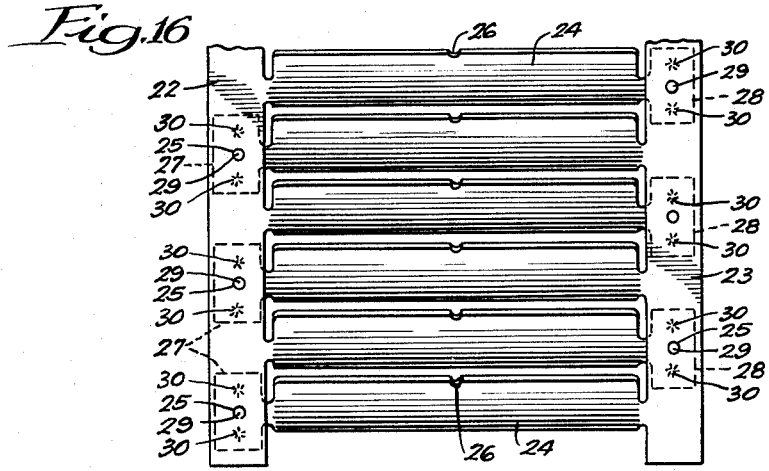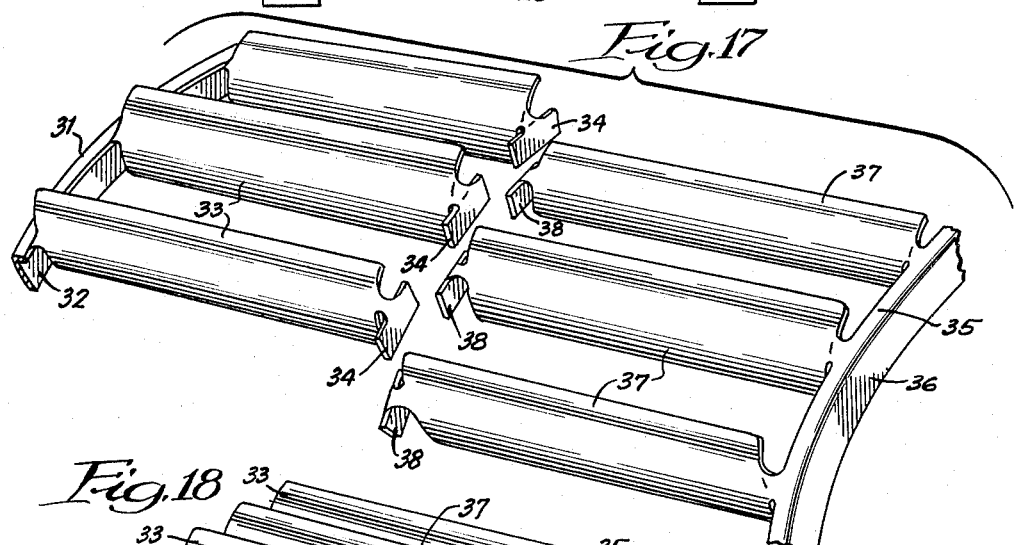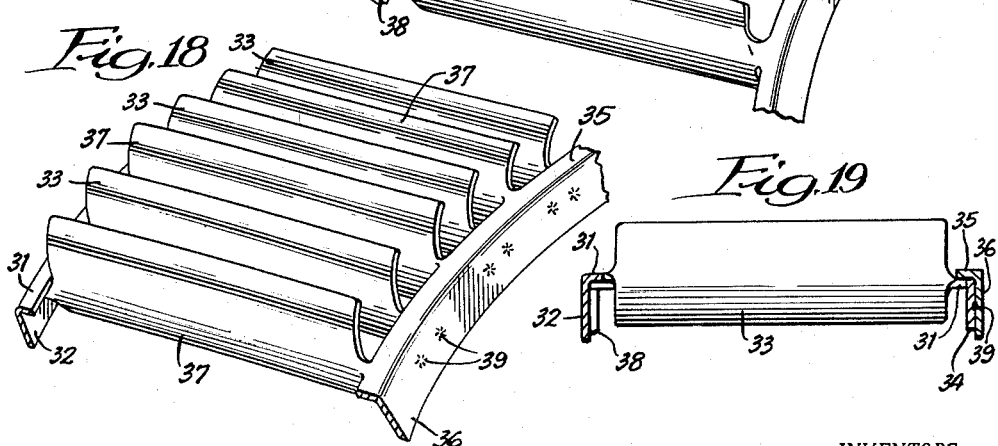

United States Patent Office 2,958,459
Patented Nov. 1, 1960

2,958,459
BLOWER FABRICATION

Alwin B. Newton, 3511 Elmwood Drive, Wichita 17, Kans., and Francis W. Osborn, Wichita, Kans., assignors, by mesne assignments, to the said Alwin B. Newton Filed June 1, 1956, Ser. No. 588,825

1 Claim. (Cl. 230—134)

This invention relates to blower fabrication, and more particularly to a blower or fan structure and methods of making the same.

In the fabrication of blowers or fans from metal blanks or sheets, it is a relatively easy matter to strike vanes from the blanks and to turn these into the desired vane arrangement, but the provision of a blower with a greater number of vanes than can be obtained by simply striking the vanes from the blank has long presented a problem. To increase the number of vanes or the vane area has been a problem long attracting the attention of workers in this field. It has been proposed, as one solution, that the side bands of the blank be gathered or looped so as to bring the vanes therebetween closer together, but this operation is expensive and results in excessive and space-filling metal along the sides of the blower. It has also been proposed that a pair of blanks or sheets be employed in superposed relation in forming a cylindrical body and that vanes be struck from both blanks and utilized in the forming of the larger numbers of vanes. This structure, however, requires the use of extra metal at areas where it serves little purpose, and requires the handling of two superposed sheets of material.

We have discovered that from a blank or sheet of material, an efficient blower can be constructed having no substantial excess of material while at the same time providing any desired number of vanes, etc. We have further discovered that the fabrication operation can be carried on with a minimum of steps while employing a single sheet of starting material, or, if desired, two separate sheets of starting material, the parts being united to form an extremely sturdy and true blower structure.

An object of the present invention is to provide a blower of the above described structure in which the metal blank from which the parts are struck lies in a single plane. A further object is to provide a method and means by which an integrated blower structure is produced from metal blank material, the blank material lying in a single horizontal plane. A still further object is to provide a blower and a method of forming the same wherein there is formed from a metal sheet or sheets a pair of circular bands spaced apart, each band having integral vanes extending inwardly and overlapping the other band and united thereto. Yet a further object is to provide in such a structure reinforcing means for the vanes and arranging the vanes in true alignment in the completed blower or fan structure. Other specific objects and advantages will appear as the specification proceeds.

The invention is shown, in illustrative embodiments, by the accompanying drawings, in which—

Figure 1 is a top plan view of a blank formed in accordance with our invention; Fig. 2, a side view in elevation of the structure shown in Fig. 1; Fig. 3, a top plan view of a pair of panels having their vane edges in overlapping relation and the vanes therein formed; Fig. 4, an end view of the structure shown in Fig. 3; Fig. 5, a broken perspective view of the structure shown in Fig. 3, with the overlapping vane portions anchored to the bands; Fig. 6, a side view in elevation of a portion of the final curved blower structure; Fig. 7, a broken top plan view of a blank formed in accordance with a modified form of the invention; Fig. 8, an edge view of the structure shown in Fig. 7; Fig. 9, a broken top plan view of a pair of sheets brought together with the tabs of the vanes of one side band overlapping the opposite band; Fig. 10, a side view of the structure shown in Fig. 9; Fig. 11, a perspective view of the structure shown in Fig. 9, with the vane tabs thereof welded to the side bands; Fig. 12, a detail sectional view, the section being taken as indicated at line 12—12 of Fig. 11; Fig. 13, a broken top plan view of a metal blank die-cut in accordance with our invention; Fig. 14, a view similar to Fig. 13 but showing a second stamping operation; Fig. 15, a view similar to Fig. 14 but showing the parts arranged in accordance with a third step of the process; Fig. 16, a broken top plan view of the composite structure shown by bringing together the parts illustrated in Fig. 15 and spot-welding the overlapping parts; Fig. 17, a perspective view showing a modified form of the invention in which side panels are provided with depending flanges; Fig. 18, a perspective view of the structure formed by bringing together the parts shown in Fig. 17; and Fig. 19, a transverse sectional view of the structure shown in Fig. 18.

In the modification illustrated in Figs. 1 to 6, inclusive, we strike from a single blank sheet of metal the side band 10, having formed therewith integral vanes 11, and from the end portion of the vanes we strike outwardly attachment tabs 12. The vanes or blades 11 may be turned to the curved blade form illustrated in Figs. 4–6, the blade being twisted at 13 where the curvature of the blade or vane 11 commences. Since the forming of curved vanes from blanks of metal in this manner is well known, a further detailed description is believed unnecessary.

A second band, which is indicated by the numeral 10a, is brought into a side arrangement with band 10, as illustrated in Fig. 3, so that the vanes of one band extend between the vanes of the other band and the tabs 12 overlap the opposite band. The tabs 12 are then spot-welded at 14 to unite the free ends of the blades equipped with the tabs 12. Thus, in the finished construction, the blades 11 are integrally connected with one side band and are connected to the other side band by the welded tabs 12. While we have shown an overlapping tab which may be utilized for the securing of the free end of the vane to the opposite band, it will be understood that any suitable means may be employed for anchoring the free end of the blade of one band to the opposite band. The two bands, with the blades thus carried thereon, may be bent into the arcuate form illustrated in Fig. 6 and united to form a circular blower or fan body.

In the modification illustrated in Figs. 7 to 12, inclusive, the band 15 is formed with integral blades 16, the blank portions shown in Fig. 7 being curved to provide the curved blade structure shown in Figs. 9 to 12, inclusive. The free end of the blade 16 is provided with tabs 17 which are preferably formed with pins 18. The band 15 is provided with jigging holes 19 adapted to receive the pins 18 of another blade-equipped band 15a. The two bands 15 and 15a are brought together, as illustrated best in Figs. 9 to 12, inclusive, with the tab 17 of one band overlying the other band and with the pin 18 of the tab engaging the jigging recess or hole 19 of the opposite band. The parts may be then spot-welded together, as indicated at 20 in Figs. 11 and 12. The curving or twisting of the vanes or blades is accomplished while leaving the end tabs 17 in substantially the same plane as the band or edge piece 15 or 15a.

In the foregoing operation, the two panels have been formed separately and then brought together to form the composite blower structure. We have found that both panels can be formed advantageously and continuously from single sheets with the panels arranged end to end, and then, by moving the panels one-half blade space with respect to each other, the parts may be moved laterally together to form the composite structure. By way of illustration, the structure shown in Figs. 13–16, inclusive, is set out. In this structure, the initial blank is a single sheet of metal from which there is formed the panel 21 shown in Fig. 13. The panel 21, which is preferably formed in the first press operation, comprises the side panels 22 and 23 and the intermediate blade portions 24 extending therebetween, edge openings 25, and guide holes 26 being formed in continuous lines. The panel thus formed is substantially twice the width of the final assembled blower wheel. The second press operation strikes out the tabs 27 and 28 and the guide pins 29 therein, this operation being illustrated best in Fig. 14. A third operation, which is not illustrated, strikes the blades to the proper lateral angle and forms their curvature. In a final operation, illustrated in Fig. 15, the right-hand panel having the band 23 is indexed or advanced one-half blade space with respect to the left-hand panel having the band 22, so that the blades may be then interleaved in a direction, say, from right to left. The final assembly is shown in Fig. 16, and, in this operation, the tabs 28 are spot-welded at 30 to the bands which they overlap.

In all of the foregoing operations, the various vanes or blades are shown in interleaved arrangement, with the blade of one band lying between two blades of the other band. It will be understood, however, that, if desired, other interleaving arrangements may be employed, as, for example, where two blades may be closely arranged in integral connection with one band, and this closely-associated pair of vanes may lie between similar pairs of vanes on the opposite band. A variety of arrangements are possible under which the bands can be arranged into a wheel structure with the closely-spaced vanes of the lower wheel integrally carried by one band and having their overlapping free end portions secured to the other band.

The blades and bands may be formed with reinforcing side flanges, if desired, and this structure, which has important advantages, is set forth in Figs. 17, 18 and 19. In this structure, the band 31 on the left is provided with a depending curved flange 32, and integrally formed therewith are the vanes 33. At the free ends of the vanes 33 are depending tabs 34. The complementary panel on the right has a narrow band 35 provided with a depending vertical flange 36, and integrally formed with the band 35 are the curved vanes 37 having at their outer free ends downwardly-extending tabs 38.

When the panel structures are brought together and assembled, as illustrated in Figs. 18 and 19, the tabs 38 of band 35 lie against the flange 32 of band 31 and the two are united by the spot-welding 39. Similarly, the tab 34 of band 31 lies against the flange 36 of band 35 and is united thereto by spot-welding 39. The integrated structure thus formed provides a circular blower wheel of great strength, while containing closely-spaced vanes of substantial surface area.

As noted from the foregoing illustrations, the blower may be fabricated from a pair of panels each having side bands or edges with integral, inwardly-extending free blades, or the entire structure may be formed from a single blank sheet from which two panels are formed in pressing operations and continuously brought together in assembled relation. By providing a blower wheel from assembled vane-equipped strips formed almost entirely of single-ply metal, there is a substantial saving in metal while at the same time providing a structure of substantially uniform thickness throughout. The overlapping tab areas are small in extent while at the same time providing some reinforcement along the band where reinforcement is of value. The pressing and assembly operations are simple and permit continuous rapid production with a minimum of labor and material cost.

While, in the foregoing specification, we have set forth specific embodiments in considerable detail for the purpose of illustrating the invention, it will be understood that such details of structure and procedure may be varied widely by those skilled in the art without departing from the spirit of our invention.

We claim:

In a blower wheel, a pair of side frame-providing elongated bands, each of said bands being longitudinally arcuate with the ends thereof secured together to form a cylindrical shape, each of said bands being equipped with a plurality of equally spaced-apart integral vanes extending generally parallel to the axis of said cylindrical shape, an integral constricted portion connecting each vane with its associated band and thereby providing a free end for each vane remote from said associated band, each vane being equipped with a constricted portion adjacent to but spaced from the free end thereof to provide an enlarged flat tab, the vanes of one band being alternately disposed between the vanes of the other band and the tabs of each vane being secured to the other band.

References Cited in the file of this patent

UNITED STATES PATENTS

| | | |
|---|---|---|
| 629,121 | Bicalky | July 18, 1899 |
| 638,277 | Rigon | Dec. 5, 1899 |
| 834,939 | Schwarz | Nov. 6, 1906 |
| 1,169,469 | Dunning | Jan. 25, 1916 |
| 1,876,518 | Mathis | Sept. 6, 1932 |
| 2,217,327 | Zeidler | Oct. 8, 1940 |
| 2,291,480 | Marbach | July 28, 1942 |
| 2,362,868 | Upson | Nov. 14, 1944 |
| 2,431,647 | Mayne et al. | Nov. 25, 1947 |
| 2,470,966 | Abbott et al. | May 24, 1949 |
| 2,745,171 | King et al. | May 15, 1956 |
| 2,759,413 | Smith | Aug. 21, 1956 |
| 2,771,241 | Sprouse | Nov. 20, 1956 |

FOREIGN PATENTS

| | | |
|---|---|---|
| 161,360 | Germany | Apr. 13, 1904 |
| 495,846 | Italy | Jan. 25, 1954 |